United States Patent [19]
Steuer

[11] Patent Number: 5,938,560
[45] Date of Patent: Aug. 17, 1999

[54] BICYCLE MULTI-GEAR HUB WITH COASTER BRAKE

[75] Inventor: Werner Steuer, Schweinfurt, Germany

[73] Assignee: Fichtel & Sachs AG, Schweinfurt, Germany

[21] Appl. No.: 08/852,941

[22] Filed: May 8, 1997

[30] Foreign Application Priority Data

May 9, 1996 [DE] Germany .......................... 196 18 636

[51] Int. Cl.[6] ...................................................... F16H 3/44
[52] U.S. Cl. ........................ 475/294; 192/217.4; 475/298
[58] Field of Search ................................ 192/6 A, 217.4; 475/297, 298, 294

[56] References Cited

U.S. PATENT DOCUMENTS

| | | | |
|---|---|---|---|
| Re. 33,058 | 9/1989 | Steuer et al. | 475/289 |
| 3,134,274 | 5/1964 | Schwerdhofer | 475/294 X |
| 3,136,179 | 6/1964 | Kaiser | 475/294 |
| 3,200,669 | 8/1965 | Schwerdhofer | 475/294 |
| 3,257,868 | 6/1966 | Preece | 192/6 A X |
| 3,809,195 | 5/1974 | Schulz et al. | 192/6 A |
| 3,828,627 | 8/1974 | Schwerdhofer | 192/6 A X |
| 3,937,309 | 2/1976 | Schulz et al. | |
| 4,973,297 | 11/1990 | Bergles | 192/6 A X |

FOREIGN PATENT DOCUMENTS

| | | |
|---|---|---|
| 3819065 | 1/1989 | Germany . |
| 3732977 | 4/1989 | Germany . |

*Primary Examiner*—Rodney H. Bonck
*Attorney, Agent, or Firm*—Nils H. Ljungman & Associates

[57] ABSTRACT

A bicycle multi-gear hub with a coaster brake includes a hub body, a driver, a planetary gear arrangement and a coaster brake mechanism. The braking effect of the coaster brake mechanism is always boosted in all possible gears by the planetary gear arrangement when the driver is back-pedalled in a braking direction. The planetary gear arrangement can be shifted, if necessary, to always apply braking torque through a ring gear of the planetary gear arrangement, so that the planetary gear arrangement can be in the lowest gear of the multi-gear hub during braking. To shift the planetary gear arrangement into the lowest gear for braking when the planet carrier is connected to the driver for overdrive, a clutch member can be deflected by the planet carrier to disengage the driver from the planet carrier and engage the driver with the ring gear. The portion of the clutch member that engages the planet carrier can be configured independently of the portion of the clutch member that engages the ring gear.

20 Claims, 5 Drawing Sheets

BICYCLE MULTI-GEAR HUB WITH COASTER BRAKE

BACKGROUND OF THE INVENTION

1. Field of the Invention

The present invention relates generally to a bicycle multi-gear hub with a coaster brake. The bicycle can include a hub axle and a hub body enclosing the multi-gear hub. The multi-gear hub can include at least one planetary gear, a coaster brake, and a driver. The planetary gear can include at least one ring gear, a planetary carrier, and at least one sun wheel fixed to the hub axle. A clutch gear can be connected to the driver, so as to be non-rotating but axially movable with respect to the driver.

The clutch gear can form a structural unit with a clutch disc, which clutch disc can establish a drive connection to the planet carrier via engaging dogs on the clutch disc and grooves in the planet carrier. The clutch disc can also establish a drive connection to the ring gear via a longitudinal toothing on the clutch gear and a clutch toothing on the ring gear. The coaster brake can include a brake casing and a brake cone mechanism mounted on a coarse thread of the planet carrier. The cone can be pushed against the brake casing by moving the driver in a braking direction.

2. Background Information

Federal Republic of Germany Patent Application P 37 32 977.4 discloses a multi-gear hub in which a hub body surrounds a hub axle affixed to the bicycle frame, with a driver, a shifting planetary gear and brake mechanism arranged around the hub body. As a five-speed hub, the hub is equipped with a double planet wheel and two sun wheels, which sun wheels can be alternately fixed. Two hill gears and two overdrive gears can be selected. The elements of the planetary gear are shifted by driving either a planet carrier or a ring wheel of the planetary gear to achieve either a hill or overdrive gear ratio. A third speed is achieved as a direct gear by bypassing the planetary gear.

The brake mechanism is actuated by back-pedaling in the braking direction. The torque of the driver is transmitted via a control gear having a driving plate to the planet carrier having a coarse thread, on which a brake cone is pushed beneath a brake casing to spread the same. In overdrive and direct drive, the dogs of the planet carrier are connected with those of the driving plate so as to be non-rotating. In the hill gears, however, the driving plate is connected to the ring gear of the planetary gear. A greater force would thus be applied to the brake mechanism when back-pedaling if the torque directed to the rear were boosted via the planetary gear.

To prevent this and to achieve the same braking effect in all gears, the dogs of the driving plate and those of the ring gear are beveled such that the driving plate is forced axially back into the dogs of the planet carrier when back-pedalling, so that a braking effect in direct translation is achieved as is the case in the overdrive and direct drive gears. The design does not allow for directing the flow of force via the planetary gear to achieve a boosted braking effect on the brake mechanism in all gears. Furthermore, functional problems are to be expected with the engagement of the dogs of the driving plate in the dogs of the planet carrier when back-pedalling because the planet carrier is axially fixed and cannot deflect if the respective dogs meet.

OBJECT OF THE INVENTION

It is thus the object of the present invention to create a multi-gear hub with a planetary gear whose three-speed shift mechanism is modified such that boosted braking is achieved not only in hill gear and direct drive, but also in overdrive.

SUMMARY OF THE INVENTION

The multi-gear hub embodied in accordance with the present invention can exploit the advantage of the transmission of increased torque to the brake mechanism in direct drive and in the hill gear in such a manner that suitable measures also permit boosted braking in overdrive. This can be achieved by means of the special shape of the dogs on the planet carrier, which dogs on the planet carrier can axially reject the dogs on the driving plate when back-pedalling and form a linkage between the clutch gear and the ring gear prior to the transmission of the braking moment. A boosted braking effect can thus be realized in overdrive as well as the other two gears of the three-speed planetary gear.

In a possible embodiment of the present invention, a multi-gear hub with a coaster brake or back-pedal brake for a bicycle can include at least one planetary gear. The planetary gear can include at least one ring gear, a planet carrier with at least single-stage planet wheels, and at least one sun wheel preferably fixed to a hub axle. The planetary gear can transmit torque between an input member and an output member of the planetary gear, and depending on which component of the planetary gear is used as an input member and which component of the planetary gear is used as an output member, the transmission ratio of the planetary gear can be varied. Because the use of a planetary gear as a variable transmission to transmit torque is known, a general description of the operation of a planetary gear and the interactions of the planetary gear components will be omitted.

The planet carrier can contain a plurality of grooves or recesses. A clutch disc can include a plurality of engaging dogs or projections to engage the grooves of the planet carrier to transmit torque from the clutch disc to the planet carrier when the clutch disc is driven in the driving direction (that is, to drive the bicycle forward). Each groove of the planet carrier can include a clutch surface oriented substantially parallel to the hub axis to receive the driving torque transferred to the planet carrier from the driving clutch disc.

Each groove of the planet carrier can also include a deflection surface preferably oriented or inclined towards the hub axis. When the clutch disc is driven in the braking direction (that is, when the bicycle is back-pedalled to actuate a coaster brake and generate braking torque), the deflection surfaces can eject the clutch disc dogs from the corresponding grooves of the planet carrier. With ejection of the dogs from the grooves, the longitudinal toothing of the clutch gear can mesh with clutch toothing of the ring gear. Braking torque can then be transmitted from the clutch gear to the ring gear of the planetary gear, and thereby transmitted through the planetary gear to a brake mechanism.

The planetary gear can have a plurality of predetermined gears or gear ratios or drive ratios, to permit the changing of gears or speeds of the multi-gear hub. The planetary gear can be shifted from one gear to another by changing the input member to the planetary gear and/or by changing the output member of the planetary gear. For example, in a possible embodiment of the present invention, to shift the planetary gear into a lowest gear, the planet carrier can be made the input to the planetary gear, and the ring gear can be made the output of the planetary gear. In this lowest gear, the rotation speed of the output of the planetary gear can be the slowest speed of the hub for a given input speed and can represent a hill climbing gear of the hub. To shift the planetary gear to the highest gear, the ring gear can be made the input to the planetary gear and the planet carrier can be the output of the planetary gear. In this highest gear, the rotation speed of the output of the planetary gear can be the highest speed of the hub for the given input speed and can represent an overdrive speed of the hub. An intermediate gear can also be selected by having both the input and output of the planetary gear be the same member to create a direct drive. In direct drive, the gear ratio can be approximately 1 because the rotation speed of the input to the planetary gear can essentially equal the rotation speed of the output of the planetary gear. In a possible embodiment of the present invention, the ring gear can be used as both input to and output from the planetary gear to establish a direct drive gear or intermediate gear of the planetary gear.

Because the gear of the planetary gear when the braking torque is transmitted by the ring gear to the planet carrier can be a lower gear than the gear of the planetary gear when the driving torque is transmitted through the planet carrier, the braking torque or brake force can be multiplied or boosted in comparison with the braking torque or brake force generated had the gear of the planetary gear remained constant upon braking in a higher gear.

In other words, for a possible embodiment of the present invention, because the planetary gear can be shifted into its lowest gear (that is, the gear having the slowest output rotation speed for a given input rotation speed to the planetary gear) upon actuation of the back-pedal brake, the braking torque or brake force can be multiplied or boosted in comparison with the braking torque or brake force generated had either no shifting to the lowest gear occurred, or the planetary gear were shifted into some other higher gear (that is, a gear having a higher output rotation speed for a given input rotation speed to the planet gear).

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

One embodiment of a three-speed hub with boosted braking is explained in greater detail with reference to the attached drawings, wherein.

DESCRIPTION OF THE PREFERRED EMBODIMENT

Figure 1:
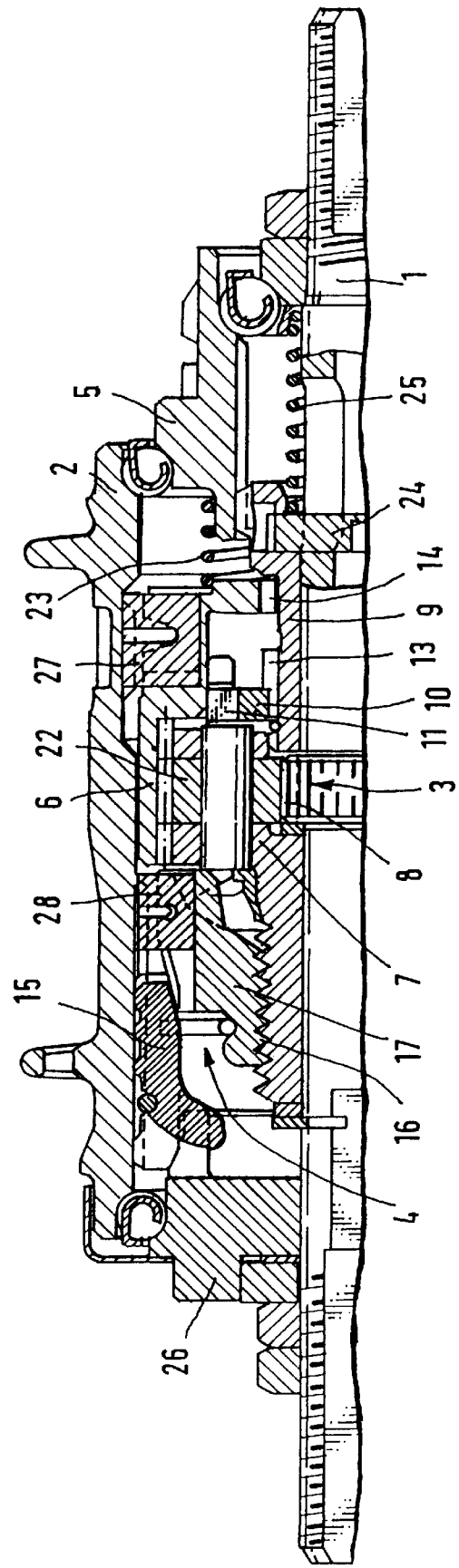
FIG. 1 is a sectional view of a three-speed hub having a planetary gear, including a ring gear, planet wheels on a planet carrier and a sun wheel, and a shift mechanism in the form of a clutch wheel with a clutch disc.
Figure 1A:
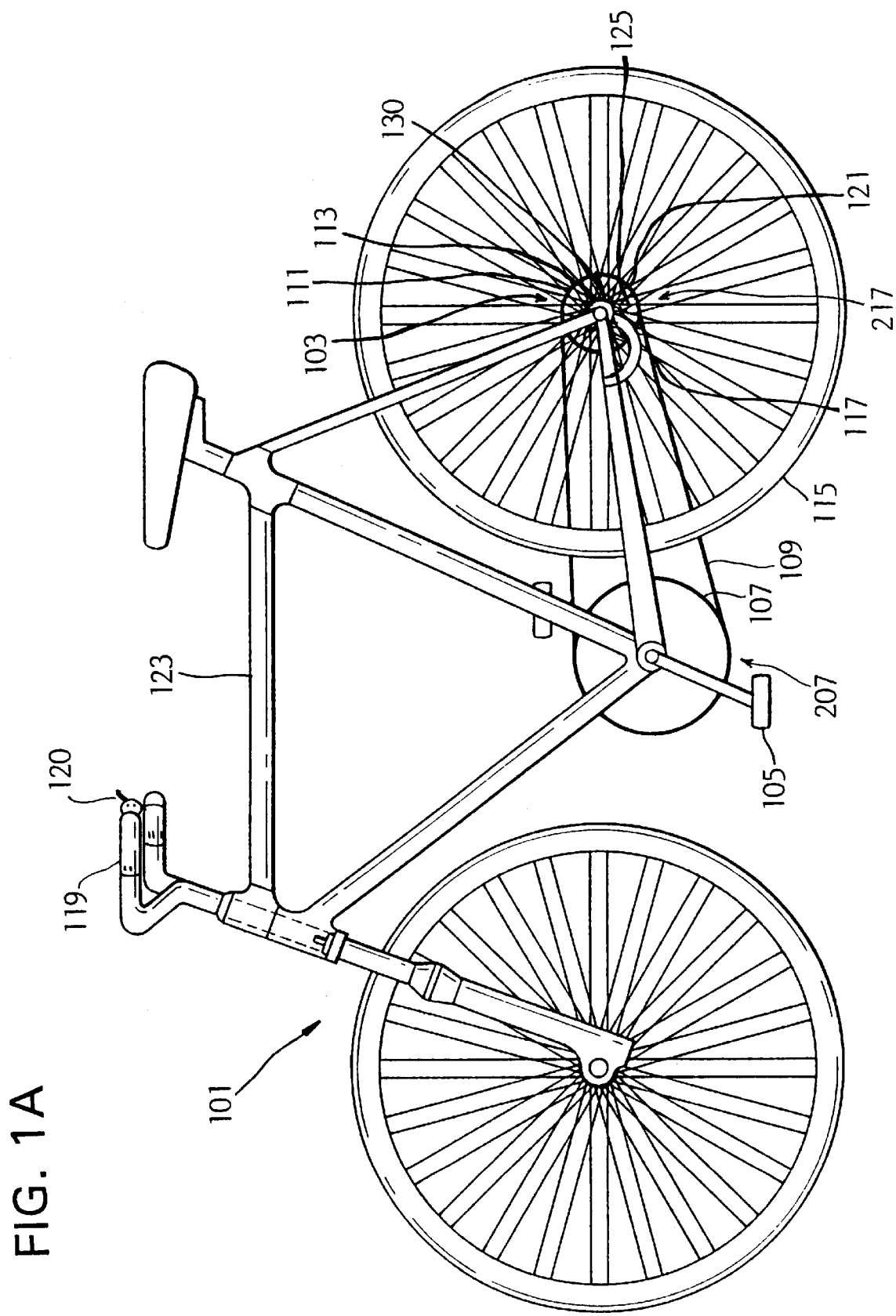
FIG. 1A is a schematic view of a bicycle that can employ an embodiment of a three-speed hub with boosted braking in accordance with the present invention.

FIG. 1A schematically illustrates a bicycle 101 that could employ a multiple speed or multi-speed or multiple gear or multi-gear hub 103 realized in accordance with the present invention. In a possible embodiment of the multi-gear hub 103, the multi-gear hub 103 can be a three-speed hub.

The bicycle 101 can include pedals 105 to apply torque to a front sprocket 107. The front sprocket 107 can be a sole front sprocket 107, or can be the front sprocket 107 of a multiple front sprocket set 207. The front sprocket 107 can transmit torque to a chain 109, which chain 109 can be non-rotatably connected to the multi-gear hub 103. A wheel 115 can be mounted on the multi-gear hub 103, and the multi-gear hub 103 can transmit torque received from the chain 109 to the wheel 115.

The multi-gear hub 103 can include a torque input member 111 and a torque output member 113. The torque input member 111 can be non-rotatably connected to the chain 109 to receive torque, and torque can be transmitted from the torque input member 111 to the torque output member 113. The torque input member 111 can, for a possible embodiment of the present invention, include a rear sprocket 117. The rear sprocket 117 can be a sole rear sprocket 117, or in a possible alternative of the present invention, be a rear sprocket 117 of a multiple rear sprocket set 217. The wheel 115 can be mounted on the torque output member 113 to receive the torque transmitted from the pedals 105 and transmitted through the multi-gear hub 103.

The multi-gear hub 103 can include a transmission 130 to vary the transmission ratio or gear ratio or rotation speed ratio between the torque output member 113 and the torque input member 111. The gear ratio can be considered the ratio of the input rotation speed to the transmission 130 and the resulting output rotation speed from the transmission 130, or equivalently, the input rotation speed divided by the output rotation speed of the transmission 130. To illustrate, for a possible embodiment of the present invention, if one rotation of the torque input member 111 resulted in one rotation of the torque output member 113, a 1:1 gear ratio, or a gear ratio of 1, would exist. If one rotation of the torque input member 111 resulted in 1.2 rotations of the torque output member 113 and thus 1.2 rotations of the wheel 115, a 1:1.2 gear ratio, or a gear ratio of approximately 0.83 would exist. If one rotation of the torque input member 111 resulted in 0.8 rotations of the output member 113, a 1:0.8 gear ratio, or a gear ratio of approximately 1.25 would exist.

A given gear of the transmission 130 can be considered a "lower" gear in comparison to another gear of the transmission 130 if the output rotation speed of the given gear is less than the output rotation speed of the other gear for a given input rotation speed. Conversely, a given gear of the transmission 130 can be considered a "higher" gear in comparison to another gear of the transmission 130 if the output speed of the given gear is higher than the output speed of the other gear for a given input speed. For the example described above, the gear having a 1:1.2 gear ratio can be considered a "higher" gear than either the gear having a 1:1 gear ratio and the gear having a 1:0.8 gear ratio. The gear having a 1:0.8 gear ratio can be considered a "lower" gear than either the gear having a 1:1 ratio or the gear having a 1:1.2 ratio. If the transmission 130 included only the three gears 1:0.8, 1:1 and 1:1.2, the gear 1:0.8 can be considered the "lowest" gear of the transmission 130 because no other gear of the example three gears of the transmission 130 can be considered a lower gear. Similarly, the gear 1:1.2 can be considered the "highest" gear of the transmission 130 because no other gear of the example three gears could be considered a higher gear.

The transmission 130 can therefore be shifted between preferably two or more gears to establish or select the gear of the transmission 130 and thereby establish or select the speed or gear of the multi-gear hub 103.

The multi-gear hub 103 can, for a possible embodiment of the present invention, include the transmission 130 having preferably three gears or gear settings to permit three gear ratios. The transmission 130 can include a first gear, which first gear can be the lowest gear of the transmission 130. The transmission 130 can include a second gear, which second gear can have a gear ratio of approximately 1. The transmission 130 can further include a third gear, which third gear can be the highest gear. The first gear can be considered a "low" gear or "hill" gear because of the relatively slow output speed of the transmission 130. The third gear can be considered a "high" gear or "overdrive" gear because of the relatively high output speed of the transmission 130 when in third gear. In particular, the third gear can be considered an "overdrive" gear because the output speed of the transmission can exceed the input speed of the transmission 130. The second gear can be considered an intermediate gear between first gear and third gear. In a possible embodiment of the present invention, the second gear can be considered a "direct" gear because the gear ratio can be approximately 1, that is, the input speed to the transmission 130 essentially equals the output speed of the transmission 130. The second gear can be realized as a direct drive connection or synchronous connection between the torque input member 111 and the torque output member 113 to form a "direct drive" between the torque input member 111 and the torque output member 113.

The selection of the gear ratio of the multi-gear hub 103 can be controlled by a gear shifter 119 operatively connected to the multi-gear hub 103. The selection of the front sprocket 107 of the front sprocket set 207 and the selection of the rear sprocket 117 of the rear sprocket set 217 can be controlled by a sprocket shifter 120 operatively connected to each of the front sprocket set 207 and the rear sprocket set 217 for example, by cables not shown here. Because gear shifters and sprocket shifters, including derailleurs, are known, further detailed discussions of the gear shifters and sprocket shifters are omitted.

The pedals 105 can be rotated in a first direction, or forward-pedal direction of rotation, to transmit drive torque to the bicycle wheel 115. The pedals 105 can be rotated in a second direction, or back-pedal direction of rotation, to actuate a back-pedal brake or coaster brake 121 of the multi-gear hub 103, to apply braking torque to the wheel 115. The back-pedal brake 121 can transmit the braking forces to a bicycle frame 123 via a brake arm 125 preferably connected to the bicycle frame 123.

As shown in FIG. 1, arranged around a hub axle 1 of a multi-gear hub, preferably a three-speed hub, can be a preferably concentric hub body 2, a driver 5, a planetary gear 3, and a coaster brake mechanism 4. The multi-gear hub shown in FIG. 1 can, for a possible embodiment, correspond to the multi-gear hub 103 illustrated in FIG. 1a. The planetary gear 3 can include a ring gear 6, a planet carrier 7 with planet wheels 22, and a fixed sun wheel 8, which sun wheel 8 can preferably be rigidly connected to the hub axle 1.

In other words, for a possible embodiment of the present invention, the planetary gear set or planetary gear 3 can correspond to the transmission 130 shown in FIG. 1A.

The brake mechanism 4 can include a brake casing 15 and a brake cone 17 connected via a coarse thread 16 to the planet carrier 7. The brake cone 17 can be forced, preferably at an inclined plane, beneath a preferably bipartite brake casing 15, spreading the brake casing 15 until the brake casing 15 can contact the hub body 2. A catch can preferably connect the brake casing 15 non-rotationally to a brake arm cone 26, which brake arm cone 26 can transmit the braking forces to the bicycle frame 123 via a brake arm 125 preferably connected to the bicycle frame 123 (see FIG. 1A).

Figure 7A:
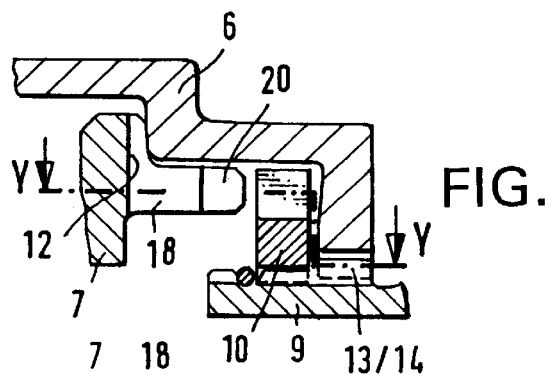
Figure 7B:
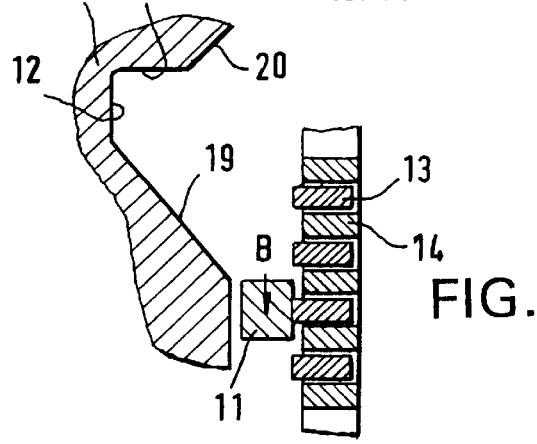

The present invention relates primarily to the shift mechanism for selecting the preferably three gears by moving the driver 5 in a driving direction A (see FIG. 5B), as well as the function of the brake mechanism 4 when moving the driver 5 in a braking direction B (see FIG. 7B). The braking direction B can be opposite the driving direction A.

In other words, and in accordance with one embodiment of the present invention, the driver 5 can rotate in the first direction of rotation A about hub axle 1 to drive the bicycle 101 forward. The direction of rotation A can correspond to the forward-pedal direction of rotation of the pedals 105. The driver 5 can rotate in the second direction B, opposite to the direction A, to actuate the braking mechanism 4 and apply a braking moment to the hub axle 1. The second direction B can correspond to the back-pedal direction of rotation of the pedals 105.

To select overdrive, direct drive or hill gear, the driver 5 can be connected to either the ring gear 6 or the planet carrier 7 by means of a clutch gear 9. The clutch gear 9 can move axially and can form a structural unit with a clutch disc 10.

Figure 8:
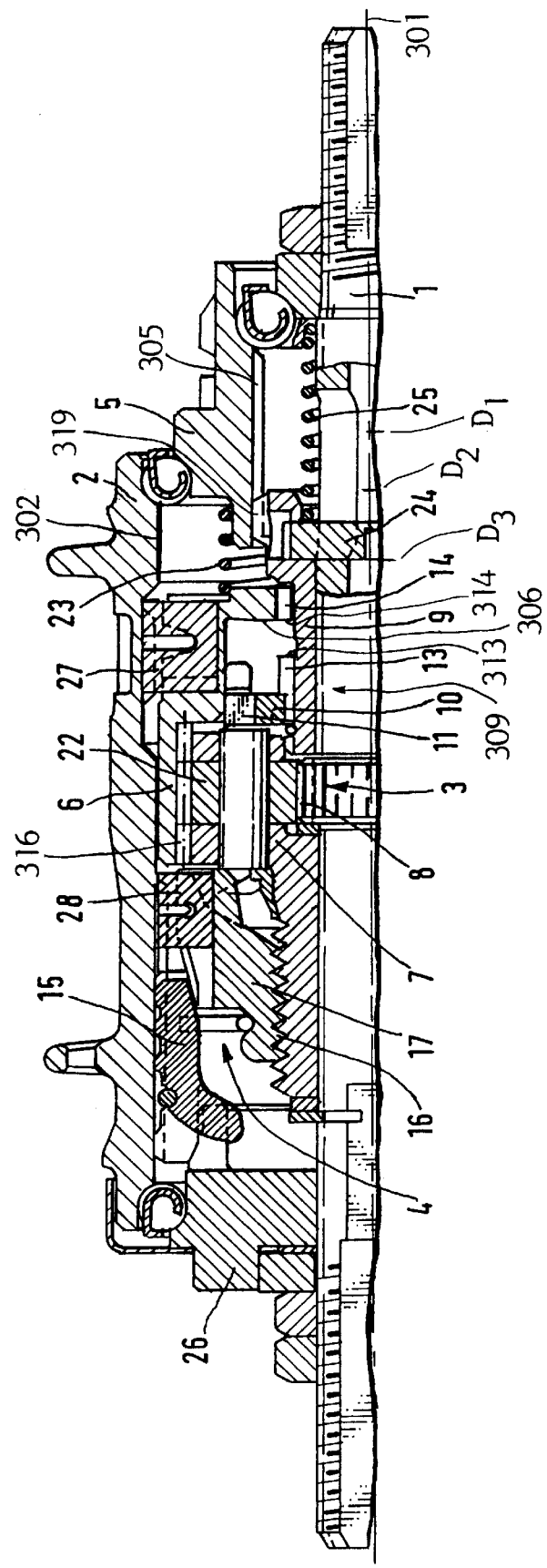
FIG. 8 is a sectional view of another embodiment of a three-speed hub having a planetary gear, including a ring gear, planet wheels on a planet carrier and a sun wheel, and a shift mechanism in the form of a clutch wheel with a clutch disc.

In other words, for a possible embodiment of the present invention as shown in FIG. 8, the torque input member 111 (shown in FIG. 1A) can correspond to the driver 5 and the clutch gear 9 (features shown in FIG. 8 that can correspond to features shown in FIG. 1 have the same reference numerals as those in FIG. 1). The driver 5 can be non-rotatably connected to the rear sprocket 117 and can thereby be non-rotatably connected to the chain 109 to receive torque from the chain 109. The driver 5 can include longitudinal toothing or gearing 305 that can mesh with longitudinal toothing or gearing 319 of the clutch gear 9 to non-rotatably connect the driver 5 and the clutch gear 9 with one another. However, the longitudinal toothing 305 of the driver 5 and the longitudinal toothing 309 of the clutch gear 9 are preferably configured to permit the clutch gear 9 to move axially with respect to the driver 5 along the hub axle 1. The axial position of the clutch gear 9 can correspond to and set the different gears or gear ratios of the planet gear 3.

FIG. 1 shows that when the three-speed hub is in overdrive or in overdrive gear, the hub body 2 can be geared up via the planetary gear 3 when the driver 5 is moved in the driving direction A so that the flow of force is from the driver 5 over the clutch gear 9; the clutch disc 10; the planet carrier 7; the planet wheels 22, which planet wheels 22 are preferably in contact with the sun wheel 8; the ring gear 6 and a first ratchet mechanism 27 to the hub body 2. Torque can be transmitted from the clutch gear 9 to the planet carrier 7 via a longitudinal toothing 13, on which longitudinal toothing 13 the clutch disc 10 can be nonrotationally mounted, and engaging dogs 11. The projections or dogs or engaging dogs 11 are preferably arranged on the outer periphery of the clutch disc 10. The dogs 11 can protrude into grooves 12 of the planet carrier 7.

In other words, for a possible embodiment of the present invention, FIG. 8 illustrates the clutch gear 9 positioned to place the planetary gear 3 in overdrive or an overdrive gear. An axial position $D_3$, located along an axis of rotation 301 defined by the axle 1, can represent the axial position of the clutch gear 9 corresponding to overdrive. The clutch gear 9, the clutch disc 10 and the engaging dogs 11 can be attached to one another so as to form a single structural unit or unitary member 309. The engaging dogs 11 can protrude into grooves 12 of the planet carrier 7 to non-rotatably connect the clutch gear 9, and hence the drive 5, with the planet carrier 7. The planet carrier 7, upon being operatively engaged with the clutch member 309, can be the input of the planetary gear 3, and the ring gear 6 can be the output of the planetary gear 3. Via the first ratchet mechanism 27, the ring gear 6 can be non-rotatively connected to the output torque member 113, preferably realized as the hub body 2, for the transmission of drive torque. When the planet carrier 7 is the input of the planetary gear 3, and the ring gear 6 is the output of the planetary gear 3, the planetary gear 3 can preferably be configured to provide an overdrive gear, that is, the output rotation speed of the ring gear 6 can be greater than the input rotation speed of the planet carrier 7.

Figure 2:
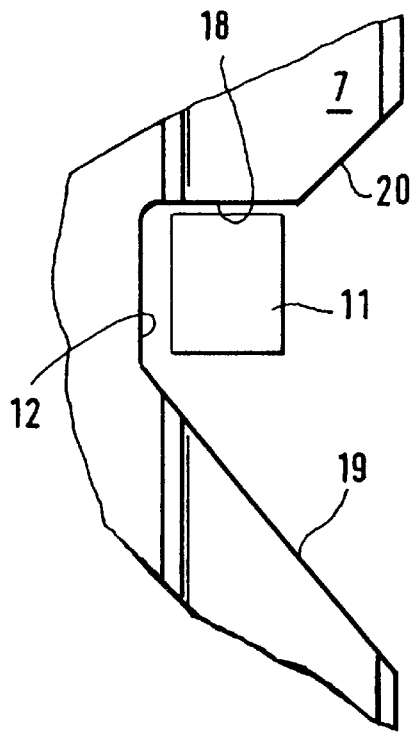
FIG. 2 shows the engaging dogs of the clutch wheel in a groove in the planet carrier having a deflecting surface.
Figure 6:
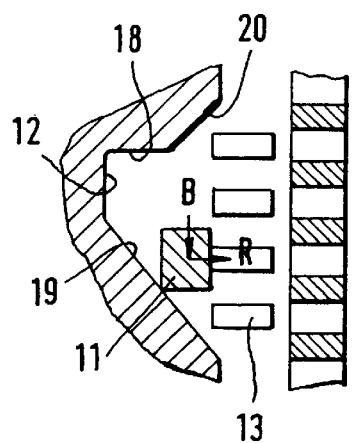

As shown in FIG. 2, the grooves 12 can be equipped with a clutch surface 18, by means of which clutch surface 18 the torque of the engaging dog 11 can be transmitted, a safety bevel 20 and a deflecting surface 19, so that the torque can be transmitted in the driving direction A by applying the engaging dogs 11 to the clutch surface 18. If the engaging dogs 11 are turned in the braking direction B, the engaging dog 11 can be deflected by the corresponding deflecting surface 19. The engaging dogs 11 are preferably moved out of the corresponding grooves 12 in an ejection direction R, as shown in FIG. 6.

Figure 3:
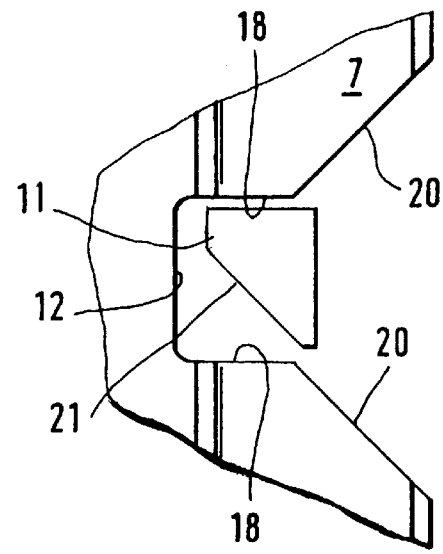
FIG. 3 shows engaging dogs having an auxiliary bevel matching a safety bevel in the planet carrier.

FIG. 3 shows a variant embodiment of the engaging dog 11 in a groove 12. The groove 12 can have a clutch surface 18 on both sides of the groove 12; however, the engaging dog 11 can have an auxiliary bevel or bevel 21. The bevel 21 can cause the engaging dog 11 to move in the ejection direction R when the driver 5 is moved in the braking direction B. In addition to the two clutch surfaces 18, the groove 12 itself can also equipped with two safety bevels 20.

Figure 4:
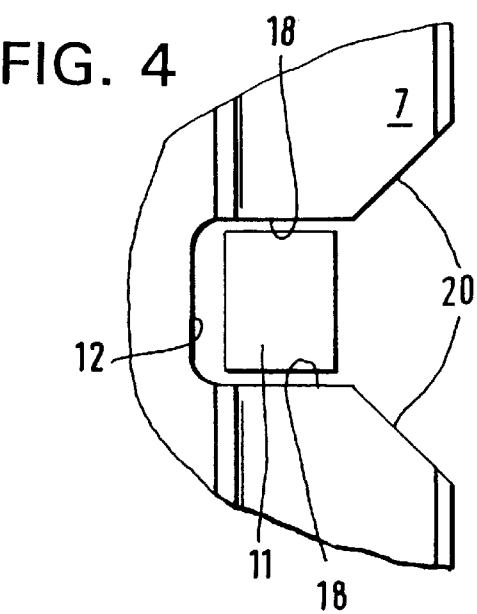
FIG. 4 shows a known embodiment of the groove in the planet carrier.

FIG. 4 shows a groove 12, the groove 12 having two clutch surfaces 18 and two safety bevels 20. An engaging dog 11, the dog 11 formed without an auxiliary bevel 21, can be inserted into the groove 12. Consequently, torque can be transmitted in both the driving direction A and the braking direction B.

Below is a brief description of the process for shifting between the three gears, wherein only braking in overdrive of the embodiment of the present invention shown in FIG. 1 is of interest. FIG. 1 shows the overdrive position, in which a sliding block 24 has pushed the clutch gear 9 towards the center of the three-speed hub to the end position of the clutch gear 9. The engaging dogs 11 of the clutch disc 10 can move into the grooves 12 of the planet carrier 7.

In other words, for a possible embodiment of the present invention as shown in FIG. 8, the clutch gear can be positioned at the axial position $D_3$ to place the planetary gear 3 into an overdrive gear.

To select direct drive, the sliding block 24 is preferably pushed outward against a spring 25 for about half of the possible travel of the sliding block 24. The longitudinal toothing 13 of the clutch gear 9 can mesh with coupling teeth 14 of the ring gear 6, and the clutch disc 10 can contact a plane surface on the ring gear 6. The connection between the engaging dog 11 and the groove 12 is preferably broken. In this configuration or operating state, the planetary gear 3 can in effect be bypassed and a direct drive selected. The driver 5 can drive the clutch gear 9 and thus the ring gear 6. A first ratchet mechanism 27 on the ring gear 6 can preferably drive the hub body 2 directly.

In other words, for a possible embodiment of the present invention as shown in FIG. 8, the clutch gear 9 can move to the right from the position $D_3$ to a position $D_2$ to place the planetary gear 3 into direct drive. When positioned at $D_2$, the engaging dogs 11 mounted on the clutch disc 9 can be disengaged from the grooves 12 of the planet carrier 7, disconnecting the planet carrier 7 as the input to the planetary gear 3. Instead, the engaging dogs 11 can be located adjacent a surface 306 of the ring gear 6 to effectly disconnect the engaging dogs 11 from the transmission of torque. The longitudinal toothing or gearing 13 of the clutch gear 9 can come into mesh with the coupling teeth or coupling gearing 14 of the ring gear 6 to non-rotatably connect the clutch disc 9, and thereby the drive 5, with the ring gear 6. Because the ring gear 6 can preferably drive the hub body 2 directly, a direct drive connection between the drive 5 and the hub body 2 can effectively be established, with essentially a 1:1 gear ratio (that is, the rotation speed of the clutch disc 9 and the hub body 2 can essentially be equal). The ring gear 6 can, when the planetary gear 6 is in direct drive, be considered both the input to the planetary gear 3 and the output of the planetary gear 3.

To select the hill gear, the sliding block 24 can be pushed in the aforementioned direction until reaching an end position of the sliding block 24. The ring gear 6 can then be displaced by the clutch disc 10, preferably disengaging the first ratchet mechanism 27. The flow of force can therefore be from the ring gear 6 over the planetary gear 3 to the preferably slower—moving or slower rotating planet carrier 7. The planet carrier 7 can move the brake cone 17 and a second ratchet mechanism 28 connected thereto in the driving direction A, driving the hub body 2.

In other words, for the possible embodiment of the present invention shown in FIG. 8, via movement of the sliding block 24, the clutch gear 9 can move further to the right from the position $D_2$ to a position $D_1$ to place the planetary gear 3 preferably into low gear, i.e. hill drive. When moving from $D_2$ to $D_1$, the engaging dogs 11 can push against the surface 306 of the ring gear 6 to carry the ring gear 6 to the right. The longitudinal toothing 13 of the clutch ring 9 and the clutch toothing 14 of the ring gear 6 can remain in mesh throughout the displacement of the clutch ring 9 from $D_2$ to $D_1$, to non-rotatably connect the clutch ring 9 and the ring gear 6 and preferably permit the ring gear 6 to become the input to the planetary gear 3. The first ratchet mechanism 27 can also axially move with the ring gear 6. The axial movement of the ratchet mechanism 27 can disengage the ratchet mechanism 27 from the hub body 2 via engagement of the ratchet mechanism 27 with a cam surface 302 of the hub body 2.

The ring gear 6 can no longer drive the hub body 2 because of the disengagement of the ratchet mechanism 27, and therefore the ring gear 6 can be prevented from being the output of the planetary gear 3. However, a longitudinal toothing or gearing 316 of the ring gear 6 can remain in mesh with the planet wheels 22 during the axial motion of the ring gear 6 between the positions $D_2$ and $D_1$. The ring gear 6 can therefore drive the planet wheels 22 to generate an output at the planet carrier 7. Preferably, the gear ratio between the planet carrier 7 and the ring gear 6 can be established such that the input rotation speed of the ring gear 6 can be greater than the output rotation speed of the planet carrier 7.

In a possible embodiment of the present invention, the hill gear can be the lowest gear of the planetary gear 3.

Figure 5A:
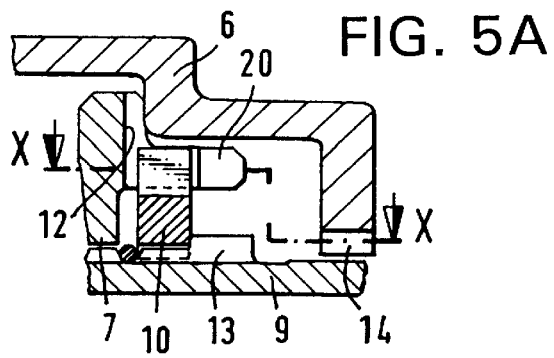
FIGS. 5A, 5B, 6, 7A and 7B show the arrangement of the elements involved in shifting, namely the planet carrier, the clutch gear with clutch disc, and the ring gear, to describe braking in overdrive.

Braking in overdrive, as shown in FIG. 1, is described in greater detail below with reference to FIGS. 5A, 5B, 6, 7A and 7B. When the driver 5 is moved in the driving direction A, the engaging dog 11 in the corresponding groove 12 of the planet carrier 7 can mesh with or engage the clutch surface 18 to drive the planet carrier 7. FIG. 5A is an excerpt or partial view from the sectional drawing shown in FIG. 1. The flow of force from the clutch gear 9 to the planet carrier 7 via the clutch disc 10 is illustrated. When the driver 5 is moved in the braking direction B, the engaging dog 11 can be deflected in an ejection direction R by the deflecting surface 19, preferably causing the longitudinal toothing 13 to likewise move in the ejection direction R towards the clutch toothing 14.

Figure 5B:
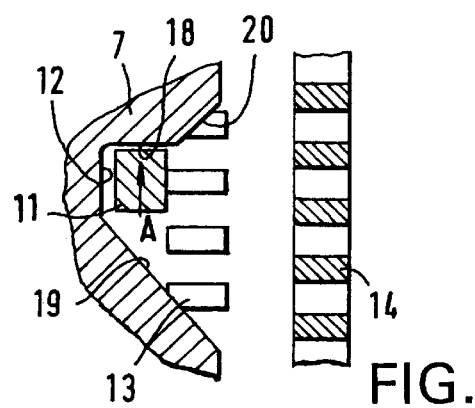

In other words, for a possible embodiment of the present invention, FIG. 5A illustrates a portion of FIG. 1. As shown in FIG. 5A, the clutch disc 10 can engage the grooves 12 of the planet carrier 7. FIG. 5B illustrates a section X—X taken through the view shown in FIG. 5A. The engaging dogs 11 can press against clutch surfaces 18 to drive the planet carrier 7 in the forward pedal direction A. FIG. 6 illustrates the engaging dogs 11, which dogs 11 can press against the deflecting surfaces 11 during back-pedaling rotation of the clutch gear 9 in the direction of rotation B. The deflecting surfaces 19 can apply an axial force to the engaging dogs 11 to move the clutch gear 9 in the ejection direction R and thereby disengage the engaging dogs 11 from the grooves 12 of the planet carrier 7.

As shown in FIGS. 7A and 7B, movement of the driver 5 in the braking direction B preferably results in the engaging dog 11 being ejected from the corresponding groove 12 in the ejection direction R via the corresponding deflecting surface 19. The longitudinal toothing 13 can mesh the clutch gear 9 with the clutch teeth 14 of the ring gear 6. The ring gear 6 can initially be carried further in the braking direction B, with the ring gear 6 preferably moving synchronously with the driver 5, gearing down the planet carrier 7 via the planet wheels 22. The brake cone 17 can move along the coarse thread 16, and the brake cone 17 can be pushed under the brake casing 15. The brake casing 15 can then spread to contact the hub body 2 and brake the bicycle 101.

In other words, for a possible embodiment of the present invention, FIG. 7A is similar to FIG. 5A, but illustrates the position of the clutch gear 9 after rejection of the engaging dogs 11 from the grooves 12 of the planet carrier 7. FIG. 7B illustrates a section Y—Y taken through the view in FIG. 7A. The driver 5 can rotate in the back-pedal or braking direction B to actuate the coaster brake or back-pedal brake 4. When the planetary gear 3 is in an overdrive gear immediately prior to actuation of the coaster brake 4, the engagement dogs 11 connected to the clutch gear 9 are preferably engaged within grooves 12 of the planet carrier 7. The rotation of the driver 5 in the braking direction B can cause the clutch gear 9 to also rotate in the braking direction B, preferably pressing each one of the engagement dogs 11 against one of the deflecting surfaces 19 to exert or generate an axially directed force on the clutch gear 9. The net axially directed force applied to the clutch gear 9 by the deflecting surfaces 19 can reject the engagement dogs 11 from the grooves 12 of the planet carrier 7 as discussed previously. In a possible embodiment of the present invention, one or more of the engagement dogs 11 can include the auxiliary bevel 21 to more efficiently transfer an axial force from the contacting deflecting surfaces 19 to the clutch gear 9.

For the possible embodiment shown in FIG. 8, the rejection of the engagement dogs 11 in the rejection direction R can preferably move the clutch gear 9 to the right, and can essentially displace the clutch gear 9 from the overdrive operating position $D_3$ to the direct drive operating position $D_2$. The rejection of the engagement dogs 11 can therefore release the engagement dogs 11 from the planet carrier 7 and can therefore disengage the planet carrier 7 as the input to the planetary gear 3. Substantially simultaneously, or within a relatively short time, the clutch gear 9 can meshingly engage the ring gear 9, via the cooperative meshing of the longitudinal toothing 13 of the clutch gear 9 and the clutch toothing 14 of the ring gear 6.

As shown in FIG. 8, for a possible embodiment of the present invention, a spring 23 can urge the ring gear 6 towards the planet carrier 7. Upon braking in overdrive, the clutch gear 9 can be moved from the axial position $D_3$ to the axial position $D_2$, to disengage the clutch gear 9 from the planet carrier 7 and to engage the clutch gear 9 with the ring gear 6, as previously described. However, as the clutch gear 9 approaches the ring gear 6 for engagement, the end faces 313 of the clutch gear toothing 13 can meet the end faces 314 of the clutch toothing 14. This contact between the end faces 313 and the end faces 314 can prevent or interfere with continued axial movement of the clutch gear 9 towards the ring gear 6, and could therefore cause jamming of the clutch gear 9 between the planet carrier 7 and the ring gear 6.

To substantially prevent jamming of the clutch gear 9 between the planet carrier 7 and the ring gear 6, the spring 23 can permit axial displacement of the ring gear 6 in the deflection direction R. Upon contact of the end faces 313 of the clutch gear toothing 13 with the end faces 314 of the clutch toothing 14, the clutch gear 9 and the ring gear 6 can each move in the rejection direction R, thereby permitting the deflecting surfaces 19 of the grooves 12 to continue rejecting or ejecting the clutch gear 9 from the grooves 12. As the engaging dogs 11 continue to rotate in the back-pedal or braking direction of rotation B, the clutch gear 9 can further rotate in the rotation direction B to permit the end faces 313 of the clutch gear toothing 13 to rotate past the end faces 314 of the clutch toothing 14. Once past, the clutch gear toothing 13 can mesh with the clutch toothing 14 to non-rotatably connect the clutch gear 9 and the ring gear 6 for braking.

The back-pedal rotation of the clutch gear 9 can therefore be transmitted to the ring gear 6 as input to the planetary gear 3. The ratchet mechanism 27 can act as a one-way clutch or freewheel device to disengage the ring gear 6 from the hub body 2 upon the ring gear 6 rotating in the back-pedal direction. Therefore, the disengagement of the planet carrier 7 and the engagement of the ring gear 6 by the clutch gear 9 upon braking can permit the ring gear 6 to become the input to the planetary gear 3 upon braking, and can permit the planet carrier 7 to become the output of the planetary gear 3 upon braking. The back-pedal rotation of the ring gear 6 can be communicated to the planet wheels 22 via the longitudinal toothing 316 of the ring gear 6 and then transferred to the planet carrier 7 to preferably actuate the coaster brake 4 and thereby transmit braking torque from the drive 5 to the hub body 2.

In other words, for a possible embodiment of the present invention as shown in FIG. 8, the clutch gear 9, the clutch disc 10 and the engaging dogs 11 can be considered a single clutch member 309 to selectively engage and disengage the planet carrier 7 and the ring gear 6. The engaging dogs 11 can be considered a first portion of the clutch member 309, and for a possible embodiment, the engaging dogs 11 and the recesses 12 can be each configured to essentially optimize or improve cooperation between them to shift the planetary gear 3 into overdrive for driving the bicycle 101, or to shift the planetary gear 3 out of overdrive for braking the bicycle 101. In a corresponding manner, the longitudinal toothing 13 of the clutch disc 9 can be considered a second portion of the clutch member 309, and the second portion of the clutch member 309 and the clutch gearing 14 of the ring gear 6 can each be configured to essentially optimize or improve the ability of the clutch member 309 and the ring gear 6 to meshingly engage one another during braking or to form a direct drive. The design and configuration of the engagement dogs 11 and the corresponding grooves 12 of the planet carrier 7 can be substantially independent of the design and configuration of the longitudinal toothing 13 and clutch gearing 14. For example, the number of engagement dogs 11 and the taper or slope of the auxiliary bevel 21 can be configured independently of the number of gear teeth or possible gear tooth shapes of the clutch gearing 14. This can be advantageous when compared to a device such as that disclosed in Federal Republic of Germany Patent Application 37 32 977.4, wherein the engaging dogs essentially must move from one engaged position to a second engaged position upon braking and the design of the engaging dogs must satisfy both engagement requirements.

As described above for overdrive, the ring gear 6 can preferably be directly driven by the clutch gear 9 in both direct drive and hill gear. Thus, the planetary gear 3 can be engaged to boost braking when the driver 5 is moved in the direction of braking B. If boosted braking in hill gear and direct drive is considered advantageous, boosted braking in overdrive can then be considered particularly advantageous. With the exception of a slight increase in the amount of dead travel between movement in the driving direction A and the braking direction B, there are essentially neither functional nor cost disadvantages associated with the present invention.

One feature of the invention resides broadly in the multi-speed or multi-gear hub with coaster brake for bicycles, comprising a hub axle 1 and a hub body 2 enclosing the former comprising at least one planetary gear 3, a coaster brake mechanism 4 and a driver 5; whereby the planetary gear 3 comprises at least one ring gear 6, a planet carrier 7 with at least single-stage planet wheels 22, and at least one sun wheel 8 which can be fixed to the hub axle 1; whereby further a clutch gear 9 is connected to the driver 5 so as to be non-rotating but axially mobile, which clutch gear 9 forms a structural unit with a clutch disc 10, which can establish a dog connection or positive connection to the planet carrier 7 via engaging dogs 11 on the clutch disc 10 and grooves 12 in the planet carrier 7, or a drive connection or non-positive connection to the ring gear 6 via a longitudinal toothing 13 on the clutch gear 9 and a clutch toothing 14 in the ring gear 6; and whereby the brake mechanism 4, comprising a brake casing 15 and a brake cone 17 mounted on a coarse thread 16 of the planet carrier 7, which cone 17 can be pushed against the brake casing 15 by moving the driver 5 in a braking direction B; characterized by the fact that the grooves 12 in the planet carrier 7 have clutch surfaces 18 parallel to the hub axle 1 in a driving direction A and deflecting surfaces inclined toward the hub axle 1 in a braking direction B, whereby the engaging dogs 11 of the clutch disc 10 move the planet carrier 7 across the clutch surfaces 18 when the driver 5 is moved in the driving direction A, but when the driver 5 is moved in the braking direction B, the engaging dogs 11 of the clutch disc 10 are ejected in the ejection direction R from the grooves 12 in the planet carrier 7 via the inclined deflecting surfaces 19, causing the longitudinal toothing 13 of the clutch gear 9 to mesh with the clutch toothing 14 of the ring gear 6.

Another feature of the invention resides broadly in the multi-speed or muli-gear hub characterized by the fact that the engaging dogs 11 of the clutch disc 10 have auxiliary bevels or bevels 21 running in approximately the same direction as a safety bevel 20 on the planet carrier 7 and which, when the driver 5 is moved in the braking direction B, interacts with the safety bevel 20 such that the engaging dogs 11 of the clutch disc 10 are ejected in the ejection direction R from the grooves 12 in the planet carrier 7, causing the longitudinal toothing 13 of the clutch gear 9 to mesh with the clutch toothing 14 of the ring gear 6.

Yet another feature of the invention resides broadly in the multi-speed or multi-gear hub characterized by the fact that a spring 23 pretensions the ring gear 6 in a direction opposite the ejection direction R of the clutch disc 10 to ensure sufficient space and time for the toothings 13 and 14 to mesh when the end faces of the teeth of the longitudinal toothing 13 meet the end faces of the clutch toothing 14 by allowing the clutch toothing 14 to deflect in the ejection direction R.

Examples of multi-gear hubs or transmissions that could be adapted for use in the context of the present invention, as well as components generally associated with multi-gear hubs, could be disclosed by the following U.S. Pat. Nos. 5,562,563, No. 5,342,258, No. 5,322,487, No. 5,273,500, No. 5,078,664, No. 4,628,769 and No. 4,371,064.

Other examples of multi-gear hubs that could be adapted for use in the context of the present invention, as well as components generally associated with multi-gear hubs, could be disclosed by the following U.S. Patents, each assigned to the assignee of the present invention: U.S. Pat. No. 5,540,456, No. 5,527,230, No. 5,469,755, No. 5,445,573, No. 5,433,279, No. 5,399,128, No. 4,973,297, No. 4,947,703, No. 4,721,013, No. 4,651,853 and No. 4,577,531.

Examples of shifters or control systems that could be used in the context of the present invention could be disclosed by the following U.S. Pat. No. 5,562,563, Other examples of shifters or control systems that could be used in the context of the present invention, each assigned to the assignee of the present invention, could be disclosed by the following U.S. Pat. Nos. 5,588,925, No. 5,556,454 and No. 5,469,755.

Examples of derailleur arrangments and sprocket sets that could be used in the context of the present invention, each assigned to the assignee of the present invention, could be disclosed by the following U.S. Pat. Nos. 5,533,611 and No. 5,503,598.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 18 636.6, filed on May 9, 1996, having inventor Werner Steuer, and DE-OS 196 18 636.6 and DE-PS 196 18 636.6, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention as described hereinabove in the context of the preferred embodiments is not to be taken as limited to all of the provided details thereof, since modifications and variations thereof may be made without departing from the spirit and scope of the invention.

What is claimed is:

1. A bicycle multi-gear hub having a coaster brake, said multi-gear hub comprising:

an axle;

a drive member rotatably mounted on said axle to receive torque from a pedal of a bicycle;

a hub body to transmit torque to a bicycle wheel mounted on said multi-gear hub;

a planetary gear arrangement to change the gear of said multi-gear hub from one gear to another;

said planetary gear arrangement being connected between said drive member and said hub body;

said planetary gear arrangement comprising:
   a ring gear being disposed about said axle;
   at least one planet wheel to mesh with said ring gear;
   a planet carrier; and
   said at least one planet wheel being rotatably mounted on said planet carrier;

a coaster brake arrangement;

said coaster brake arrangement comprising an arrangement to shift said planetary gear arrangement from a higher gear to the lowest gear upon said planetary gear arrangement being in a higher gear; and said arrangement to shift said planetary gear arrangement comprising:
   a clutch member being operatively connected between said drive member and said planetary gear arrangement;
   said clutch member being non-rotatably connected to said drive member to transmit torque between said drive member and said planetary gear arrangement;
   said clutch member comprising a dog clutch portion;
   said clutch member comprising a toothed portion;
   said planet carrier comprising a dog clutch receiving portion;
   said dog clutch receiving portion being configured and disposed to engage said dog clutch portion of said clutch member;
   said ring gear comprising a toothed receiving portion;
   said toothed receiving portion being configured and disposed to engage said toothed portion of said clutch member;
   said clutch member being disposed to be movable between said dog clutch receiving portion of said planet carrier and said toothed receiving portion of said ring gear;
   said clutch member being disposed to be engagable with said dog clutch receiving portion of said planet carrier; and
   said clutch member being disposed to be engagable with said toothed receiving portion of said ring gear to shift said planetary gear arrangement from a higher gear to the lowest gear upon said planetary gear arrangement being in a higher gear and to activate said coaster brake arrangement with said clutch member.

2. The multi-gear hub according to claim 1, wherein:

said axle defines an axis of rotation;

said clutch member is disposed about said axle;

said clutch member is movable along said axle substantially parallel to the axis of rotation;

said clutch member is movable to a first position to engage said dog clutch portion of said clutch member and said dog clutch receiving portion of said planet carrier with one another, and to disengage said toothed portion of said clutch member and said toothed receiving portion of said ring gear from one another; and said clutch member is movable to a second position to engage said toothed portion of said clutch member with said toothed receiving portion of said ring gear to permit shifting of said hub into its lowest gear upon braking, and to disengage said dog clutch portion of said clutch member and said dog clutch receiving portion of said planet carrier from one another.

3. The multi-gear hub according to claim 2, wherein:

said toothed portion of said clutch member comprises a plurality of teeth disposed about the axis of rotation;

said toothed receiving portion of said ring gear comprises a bore having an inside diameter;

said inside diameter of said bore is disposed substantially concentrically about the axis of rotation;

said inside diameter of said bore comprises a plurality of teeth disposed about the axis of rotation; and said plurality of teeth of said toothed portion of said clutch member and said plurality of teeth of said inside diameter of said ring gear bore are each configured to mesh with one another to non-rotatably connect said clutch member and said ring gear with one another upon said clutch member being disposed in the second position.

4. The multi-gear hub according to claim 3, wherein:

said dog clutch portion of said clutch member comprises a plurality of dogs;

said plurality of dogs is disposed substantially concentrically about the axis of rotation;

said planet carrier is disposed about said axle;

said dog clutch receiving portion of said planet carrier comprises a plurality of grooves;

said plurality of grooves is disposed substantially concentrically about the axis of rotation;

each groove of said plurality of grooves of said dog clutch receiving portion is disposed to permit engagement within itself of one dog of said plurality of dogs.

5. The multi-gear hub according to claim 4, wherein:

both of said clutch member and said planet carrier are rotatable about said axle in a first direction of rotation and an opposite second direction of rotation; and each groove of said plurality of grooves of said dog clutch receiving portion comprises:
  a first surface;
  said first surface defines a first plane substantially parallel to the axis of rotation;
  said first surface is disposed to receive torque from said one dog of said plurality of dogs upon said clutch member rotating in the first direction of rotation and said one dog being engaged within said each groove;
  a second surface;
  said second surface defines a second plane substantially transverse to the axis of rotation;
  the second plane defines a first angle between said second plane and the axis of rotation;
  said second surface is configured to apply a force directed substantially parallel to the axis of rotation to said one dog upon said clutch member rotating in the second direction of rotation to move said clutch member from said first position to said second position; and
  said first surface precedes said second surface in the first direction of rotation of said planet carrier.

6. The multi-gear hub according to claim 25, wherein:
each groove of said plurality of grooves comprises:
  a third surface;
  said third surface defines a third plane, the third plane being substantially parallel to the axis of rotation;
  said third surface is disposed to follow said first surface upon said planet carrier rotating in the first direction of rotation; and
  said third surface is disposed immediately adjacent said second surface;
each dog of said plurality of dogs comprises:
  a front surface;
  a rear surface;
  said rear surface is disposed to follow said first surface upon said clutch member being rotated in the first direction of rotation;
  said rear surface defines a fourth plane, the fourth plane being substantially transverse to the axis of rotation; and
  the fourth plane defines a second angle between the fourth plane and the axis of rotation, the second angle defined by the fourth plane being substantially equal to the first angle defined by the second plane.

7. The multi-gear hub according to claim 6, wherein:
said clutch member is axially movable in a first direction to move said clutch member from said first position to said second position;
said clutch member is axially movable in a second direction to move said clutch member from said second position to said first position;
said ring gear is movable along said axle in the first and second directions;
said toothed portion of said clutch member comprises a first end and an axially opposite second end;
said first end of said toothed portion of said clutch member is disposed to precede said second end of said toothed portion upon said clutch member moving in the first direction;
said first end of said toothed portion comprises a first end surface disposed substantially concentrically about the axis of rotation;
said toothed receiving portion of said ring gear comprises a first end and an axially opposite second end;
said first end of said toothed receiving portion is disposed between said planet carrier and said second end of said toothed receiving portion;

said first end of said toothed receiving portion comprises a second end surface disposed substantially concentrically about the axis of rotation;
said arrangement to shift said planetary gear arrangement further comprises a spring;
said spring is configured and disposed to urge said ring gear to move in the second direction;
said spring is configured and disposed to permit said ring gear to move in the first direction in response to contact of said first end surface and said second end surface with one another during movement of said clutch member from said first position to said second position for facilitating engagement of said toothed portion of said clutch member with said toothed receiving portion of said ring gear;
said planetary gear arrangement comprises a sun gear fixedly attached to said axle;
said planet carrier comprises a threaded portion;
said coaster brake comprises:
  a brake casing;
  a brake cone;
  said brake cone is threadingly mounted on said threaded portion of said planet carrier; and
  said brake cone is movable along said threaded portion of said planet carrier to engage said brake casing upon said planet carrier being rotated in the second direction of rotation; and
said clutch member comprises:
  a disc-shaped member disposed substantially concentrically about the axis of rotation;
  said disc-shaped member has an inner surface and an outer surface;
  said plurality of dogs is attached to the outer surface of said disc-shaped member;
  a clutch gear disposed substantially concentrically about the axis of rotation;
  said clutch gear is attached to said inner surface of said disc-shaped member; and
  said clutch gear is non-rotatably connected to said drive member.

8. The multi-gear hub according to claim 1, wherein said clutch member is configured to shift said planetary gear arrangement from a higher gear to the lowest gear and substantially simultaneously activate said coaster brake arrangement.

9. A bicycle multi-gear hub having a coaster brake with an arrangement to shift said hub from a higher gear to the lowest gear upon back pedalling to actuate said coaster brake with said hub being in a higher gear, said multi-gear hub comprising:
  a torque input member to receive torque from a pedal of a bicycle;
  a torque output member to transmit torque to a bicycle wheel mounted on said multi-gear hub;
  a transmission to change the gear of said multi-gear hub from one gear to another gear;
  said transmission being disposed between said torque input member and said torque output member;
  said transmission having a lowest gear and at least one higher gear;
  the lowest gear of said transmission having a first gear ratio, the first gear ratio being the rotation speed of said torque input member divided by the rotation speed of said torque output member upon said transmission being in the first gear;

the at least one higher gear of said transmission having a second gear ratio, the second gear ratio being the rotation speed of said torque input member divided by the rotation speed of said torque output member upon said transmission being in the at least one higher gear;

the first gear ratio of the lowest gear being greater than the second gear ratio of the at least one higher gear;

the first gear ratio of the lowest gear being the greatest gear ratio of said transmission;

a coaster brake arrangement to brake a bicycle wheel mounted on said multi-gear hub;

an arrangement to shift said transmission from the at least one higher gear into the lowest gear upon back pedalling of a pedal to actuate said coaster brake upon said transmission being in the at least one higher gear; and said arrangement to shift said transmission being configured and disposed to actuate said coaster brake arrangement.

10. The multi-gear hub according to claim 9, wherein:

said transmission comprises a first gear member;

said first gear member is operatively connected between said torque input member and the remainder of said transmission upon said transmission being in the lowest gear;

said transmission comprises a second gear member;

said second gear member is operatively connected between said torque input member and the remainder of said transmission upon said transmission being in the at least one higher gear;

said arrangement to shift said transmission comprises a clutch member;

said clutch member is configured to rotate about an axis of rotation;

said clutch member is non-rotatably connected to said torque input member to transmit torque between said transmission and said torque input member; and said clutch member is movable between said first gear member and said second gear member.

11. The multi-gear hub according to claim 10, wherein:

said multi-gear hub comprises an axle configured to be fixedly mounted on a frame of a bicycle;

said transmission comprises a planetary gear arrangement;

said planetary gear arrangement comprises:
 a ring gear;
 said ring gear is disposed about said axle;
 at least one planet wheel to mesh with said ring gear;
 a planet carrier; and
 said at least one planet wheel is rotatably mounted on said planet carrier;

said first gear member of said transmission comprises said planet carrier; and said second gear member of said transmission comprises said ring gear.

12. The multi-gear hub according to claim 11, wherein:

said clutch member comprises a dog clutch portion;

said clutch member comprises a toothed portion;

said arrangement to shift said transmission comprises a portion of said planet carrier;

said portion of said planet carrier comprises a dog clutch receiving portion;

said dog clutch receiving portion is configured and disposed to engage said dog clutch portion of said clutch member;

said ring gear comprises a toothed receiving portion;

said toothed receiving portion being configured and disposed to engage said toothed portion of said clutch member; and said clutch member is movable between and engagable with each of said dog clutch receiving portion of said planet carrier and said toothed receiving portion of said ring gear.

13. The multi-gear hub according to claim 12, wherein:

said axle defines an axis of rotation;

said clutch member is disposed about said axle to rotate about the axis of rotation;

said clutch member is movable along said axle substantially parallel to the axis of rotation;

said clutch member is movable to a first position to engage said dog clutch portion of said clutch member and said dog clutch receiving portion of said planet carrier with one another, and to disengage said toothed portion of said clutch member and said toothed receiving portion of said ring gear from one another; and said clutch member is movable to a second position to engage said toothed portion of said clutch member with said toothed receiving portion of said ring gear, and to disengage said dog clutch portion of said clutch member and said dog clutch receiving portion of said planet carrier from one another.

14. The multi-gear hub according to claim 13, wherein:

said toothed portion of said clutch member comprises a plurality of teeth disposed about the axis of rotation;

said toothed receiving portion of said ring gear comprises a bore;

said bore has an inside diameter;

said inside diameter of said bore is disposed substantially concentrically about the axis of rotation;

said inside diameter of said bore comprises a plurality of teeth disposed about the axis of rotation; and said plurality of teeth of said toothed portion of said clutch member and said plurality of teeth of said inside diameter of said ring gear bore are each configured to mesh with one another to non-rotatably connect said clutch member and said ring gear with one another upon said clutch member being disposed in the second position.

15. The multi-gear hub according to claim 14, wherein:

said dog clutch portion of said clutch member comprises a plurality of dogs;

said plurality of dogs is disposed substantially concentrically about the axis of rotation;

said planet carrier is disposed about said axle;

said dog clutch receiving portion of said planet carrier comprises a plurality of grooves;

said plurality of grooves is disposed substantially concentrically about the axis of rotation; and each groove of said plurality of grooves of said dog clutch receiving portion is disposed to permit engagement within itself of a dog of said plurality of dogs.

16. The multi-gear hub according to claim 15, wherein:

both of said clutch member and said planet carrier are rotatable about said axle in a first direction of rotation and an opposite second direction of rotation; and each groove of said plurality of grooves of said clutch dog receiving portion comprises:
 a first surface;

said first surface defines a first plane substantially parallel with the axis of rotation;
said first surface is disposed to receive torque from said dog of said plurality of dogs upon said clutch member rotating in the first direction of rotation and said dog being engaged within said each groove;
a second surface;
said second surface defines a second plane substantially transverse to the axis of rotation;
the second plane defines a first angle between said second plane and the axis of rotation;
said second surface is configured to apply a force directed substantially parallel to the axis of rotation to said one dog upon said clutch member rotating in the second direction of rotation for moving said clutch member from said first position to said second position; and
said first surface precedes said second surface in the first direction of rotation of said planet carrier.

17. The multi-gear hub according to claim 16, wherein:
said clutch member is axially movable in a first direction to move said clutch member from said first position to said second position;
said clutch member is axially movable in a second direction to move said clutch member from said second position to said first position;
said ring gear is movable along said axle in the first and second directions;
said toothed portion of said clutch member comprises a first end and an axially opposite second end;
said first end of said toothed portion of said clutch member is disposed to precede said second end of said toothed portion upon said clutch member moving in the first direction;
said first end of said toothed portion comprises a first end surface disposed substantially concentrically about the axis of rotation;
said toothed receiving portion of said ring gear comprises a first end and an axially opposite second end;
said first end of said toothed receiving portion is disposed between said planet carrier and said second end of said toothed receiving portion;
said first end of said toothed receiving portion comprises a second end surface disposed substantially concentrically about the axis of rotation;
said arrangement to shift said planetary gear arrangement further comprises a spring;
said spring is configured and disposed to urge said ring gear to move in the second direction; and
said spring is configured and disposed to permit said ring gear to move in the first direction in response to contact of said first end surface and said second end surface with one another during movement of said clutch member from said first position to said second position to facilitate engagement of said toothed portion of said clutch member with said toothed receiving portion of said ring gear.

18. The multi-gear hub according to claim 17, wherein:
each groove of said plurality of grooves comprises:
  a third surface;
  said third surface defines a third plane, the third plane being substantially parallel to the axis of rotation;
  said third surface is disposed to follow said first surface upon said planet carrier rotating in the first direction of rotation; and
  said third surface is disposed immediately adjacent said second surface;
each dog of said plurality of dogs comprises:
  a front surface;
  a rear surface;
  said rear surface is disposed to follow said first surface upon said clutch member being rotated in the first direction of rotation;
  said rear surface defines a fourth plane, the fourth plane being substantially transverse to the axis of rotation; and
  the fourth plane defines a second angle between said fourth plane and the axis of rotation, the second angle defined by the fourth plane being substantially equal to the first angle defined by the second plane.

19. The multi-gear hub according to claim 18, wherein:
said planet carrier comprises a threaded portion;
said coaster brake arrangement comprises said threaded portion of said planet carrier;
said coaster brake arrangement further comprises:
  a brake casing;
  a brake cone;
  said brake cone is threadingly mounted on said threaded portion of said planet carrier;
  said brake cone is non-rotatably connected to said planet carrier upon said planet carrier being rotated in the first direction to permit freewheeling of said brake cone in the first direction of rotation; and
  said brake cone is movable along said threaded portion of said planet carrier to engage said brake casing upon said planet carrier being rotated in the second direction of rotation.

20. The multi-gear hub according to claim 19, wherein:
said planetary gear arrangement comprises a sun gear fixedly attached to said axle; and
said clutch member comprises:
  a disc-shaped member disposed substantially concentrically about the axis of rotation;
  said disc-shaped member having an inner surface and an outer surface;
  said plurality of dogs is attached to said outer surface of said disc-shaped member;
  a clutch gear disposed substantially concentrically about the axis of rotation;
  said clutch gear is attached to said inner surface of said disc-shaped member; and
  said clutch gear is non-rotatably connected to said drive member.

* * * * *

UNITED STATES PATENT AND TRADEMARK OFFICE
CERTIFICATE OF CORRECTION

PATENT NO.   : 5,938,560
DATED        : August 17, 1999
INVENTOR(S)  : Werner STEUER It is certified that error appears in the above-identified patent and that said Letters Patent is hereby corrected as shown below:

In column 14, line 15, Claim 2, after 'claim', delete "1," and insert --8,--.

In column 15, line 22, Claim 6, after 'claim', delete "25," and insert --5,--.

Signed and Sealed this

Twenty-sixth Day of December, 2000

Attest:

Q. TODD DICKINSON

*Attesting Officer*  *Director of Patents and Trademarks*

UNITED STATES PATENT AND TRADEMARK OFFICE
CERTIFICATE OF CORRECTION

PATENT NO. : 5,938,560
DATED : August 17, 1999
INVENTOR (S) : Steuer

It is certified that error appears in the above-identified patent and that said Letters Patent is hereby corrected as shown below:

On the title page, item [73] Assignee: delete "Fichtel & Sachs AG." and insert

-- SRAM Deutschland Gmbh --.

Signed and Sealed this

Twentieth Day of February, 2001

Attest:

NICHOLAS P. GODICI

*Attesting Officer*   *Acting Director of the United States Patent and Trademark Office*